US009648116B2

(12) United States Patent
Morton et al.

(10) Patent No.: US 9,648,116 B2
(45) Date of Patent: May 9, 2017

(54) SYSTEM AND METHOD FOR MONITORING MOBILE DEVICE ACTIVITY

(71) Applicant: OPTIFI INC., Peterborough (CA)

(72) Inventors: Robert A. Morton, Peterborough (CA); David Jonkers, Peterborough (CA); Mary MacPherson, Peterborough (CA)

(73) Assignee: OPTIFI INC., Peterborough (CA)

( * ) Notice: Subject to any disclaimer, the term of this patent is extended or adjusted under 35 U.S.C. 154(b) by 0 days.

(21) Appl. No.: 15/033,446

(22) PCT Filed: Apr. 22, 2015

(86) PCT No.: PCT/CA2015/000264
§ 371 (c)(1),
(2) Date: Jun. 13, 2016

(87) PCT Pub. No.: WO2015/161357
PCT Pub. Date: Oct. 29, 2015

(65) Prior Publication Data
US 2016/0285981 A1    Sep. 29, 2016

Related U.S. Application Data

(63) Continuation-in-part of application No. 14/513,625, filed on Oct. 14, 2014.
(Continued)

(51) Int. Cl.
H04L 29/08    (2006.01)
H04L 29/06    (2006.01)
(Continued)

(52) U.S. Cl.
CPC ......... H04L 67/22 (2013.01); G06Q 30/0205 (2013.01); H04L 65/4069 (2013.01); H04L 67/306 (2013.01); H04W 4/021 (2013.01)

(58) Field of Classification Search
None
See application file for complete search history.

(56) References Cited

U.S. PATENT DOCUMENTS 8,190,194 B2     5/2012    Brisebois
2009/0197616 A1  8/2009    Lewis et al.
(Continued)

OTHER PUBLICATIONS

International Search Report issued by the Canadian Intellectual Property Office dated Jul. 28, 2015 for corresponding International Patent Application No. PCT/CA2015/000264 filed Apr. 22, 2015.
(Continued)

Primary Examiner — Ranodhi Serrao
(74) Attorney, Agent, or Firm — Perry + Currier Inc.

(57) ABSTRACT

A method and server for monitoring the physical activities of a mobile device is provided. The server receives descriptive data from a monitor, the descriptive data including a time, a monitor identifier and a device identifier. Additional descriptive data based on the monitor identifier is selected and a profile based on the descriptive data and the additional descriptive data is updated. The profile is further updated based on a time based activity. The additional descriptive data can include classifications and at least one keyword associated with each classification. Each keyword associated with each classification is selected based on a location of the monitor. The profile can be associated with at least one of the device identifier and the monitor identifier. The server can further maintain additional profiles and aggregate the maintained to form a macro profile.

2 Claims, 9 Drawing Sheets

Related U.S. Application Data

(60) Provisional application No. 61/982,533, filed on Apr. 22, 2014.

(51) Int. Cl.
*G06Q 30/02* (2012.01)
*H04W 4/02* (2009.01)

(56) References Cited

U.S. PATENT DOCUMENTS

| | | |
|---|---|---|
| 2012/0100867 A1 | 4/2012 | Liang et al. |
| 2012/0108293 A1 | 5/2012 | Law et al. |
| 2013/0080588 A1 | 3/2013 | Ibasco et al. |
| 2013/0246175 A1 | 9/2013 | Bilange et al. |
| 2013/0267255 A1 | 10/2013 | Liu et al. |

OTHER PUBLICATIONS

Written Opinion of the International Authority issued by the Canadian Intellectual Property Office dated Jul. 28, 2015 for corresponding International Patent Application No. PCT/CA2015/000264 filed Apr. 22, 2015.
Tynan, "Attention shoppers: Retailers can no track you across the mall", IT World, Jan. 17, 2003, retrieved from http://www.itworld.com/article/2832804/it-management/attention-shoppers—retailers-can-now-track-you-across-the-mall.html.
Brochure, "Navizon Indoor Triangulation System (I.T.S.)" Navizon, Inc. 2013, downloaded from https://www.navizon.com/files/Navizon_ITS_Fact_Sheet.pdf.
"Euclid Analytics—Products—Technology", captured from http://euclidanalytics.com/products/technology/ on Jan. 19, 2015.

SYSTEM AND METHOD FOR MONITORING MOBILE DEVICE ACTIVITY

RELATED APPLICATIONS

This application claims priority to U.S. patent application Ser. No. 61/982,533, filed Apr. 22, 2014, and U.S. patent application Ser. No. 14/513,625, filed Oct. 14, 2014, which are incorporated herein by reference.

FIELD OF THE INVENTION

The present invention relates generally to a network based monitoring of physical activity. More specifically, the present invention relates to a network based monitoring of the physical movements of a mobile device.

BACKGROUND OF THE INVENTION

Having an insight into the behavior and preferences of users of a system allows delivery of better services to those users. For example, shops with an insight into behavioral histories of shoppers can stock products that are of interest to those shoppers. Museums, on the other hand, can get a better understanding of which displays are of more interest to their patrons and organize museum exhibits accordingly. Alternatively, content providers can target the content to be provided appropriately, whether the content is used for advertising, informational or educational purposes.

One of the key requirements of acquiring historic behavioral patterns is automated data collection. In a networked environment, data collection regarding a user's activity can be readily carried out by collecting data regarding a user based on a user account and activity of that account at web sites, social networks and other digital activities. Cookies and other tracking mechanisms facilitate tracking and data collection.

Collecting such data coherently for a user regarding that user's physical activity, however, is challenging since a user does not automatically log in to an account to perform their physical activities. Moreover, data collection becomes even more challenging given privacy requirements. Accordingly, new system and methods that address problems specifically associated with collecting data regarding a user's physical activities are needed.

SUMMARY OF THE INVENTION

It is an object to provide a novel system and method for collection of data regarding physical activities that obviates and mitigates at least one of the above-identified disadvantages of the prior art.

According to an aspect of the present invention, a monitoring server can be provided. The monitoring server can receive descriptive data from a monitor. The descriptive data can include a time, a monitor identifier and a device identifier. Additional descriptive data based on the monitor identifier can be assigned and selected and a profile based on the descriptive data and the additional descriptive data can be updated. The profile can be further updated based on a time based activity. The additional descriptive data can include classifications and at least one keyword associated with each classification. Each keyword associated with each classification can be assigned and assessed based on a location of the monitor. The profile can be associated with at least one of the device identifier and the monitor identifier.

The server can further maintain additional profiles and aggregate the maintained to form a macro profile.

According to another aspect of the present invention, a system can include an input interface configured to receive log data from at least one remote media station, the log data indicative of playback of media files at the at least one remote media station. The input interface can be further configured to receive mobile device presence information from at least one remote monitor. The remote monitor can be positionally associated with the at least one remote media station. The mobile device presence information can include time information indicating at least one time that at least one mobile device was in proximity to the remote monitor. A monitoring engine can be configured to obtain media playback time information from the log data, match the time information from the log data with time information of the at least one mobile device to obtain a mobile device identifier for any mobile device in proximity to the remote monitor during playback of media files, and store associations of media files and mobile device identifiers. A report output interface can be configured to output at least one report based on at least one association of at least one media file and at least one mobile device identifier.

These, together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION

Figure 1:
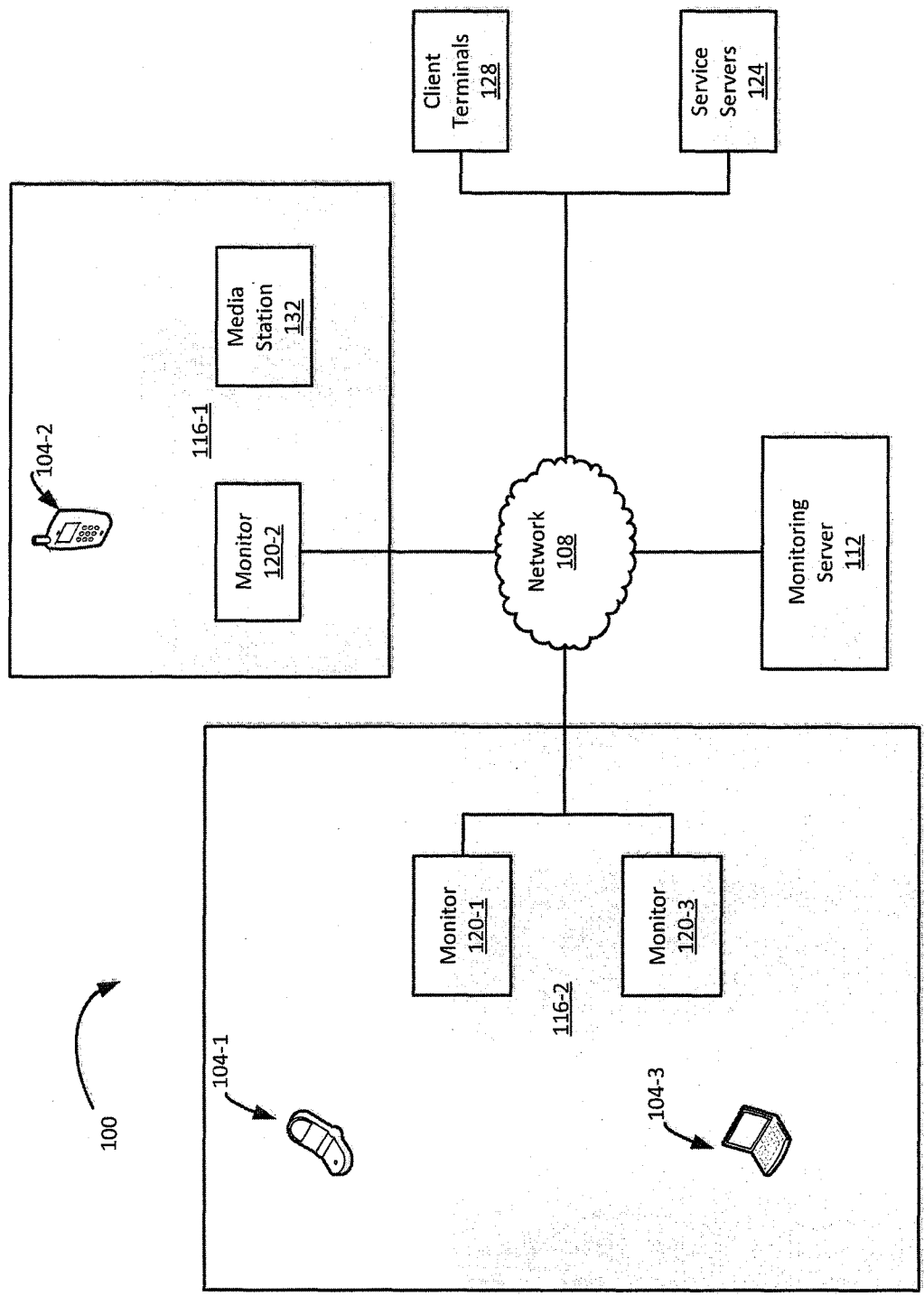
FIG. 1 shows a block diagram of a system for physical activity monitoring in accordance with an implementation.

FIG. 1 shows a diagram of a system 100 for monitoring physical activity of devices in accordance with an example implementation. At least one client device (client devices 104-1, 104-2 and 104-3) is in communication range of at least one monitor (monitors 120-1, 120-2, 120-3). Collectively, the mobile devices 104-1, 104-2 and 104-3 are referred to as the mobile devices 104, and generically as the mobile device 104. Collectively, the monitors 120-1, 120-2 and 120-3 are referred to as the monitors 120, and generically as the monitor 120. This nomenclature is used elsewhere herein.

The mobile devices 104 can be based on any suitable transmission interface, and the type is not particularly limited so long as each mobile device 104 is capable of communicating with a monitor 120. In a present embodiment, mobile devices 104 are configured to at least announce their presence to one or more of the monitors 120 within range.

The mobile devices 104 can simply be transmitters, such as transmitter tags, that are worn by users. The tags can be capable of performing transmissions that can be detected by a monitor 120 and can include a device identifier of the tag that can be obtained by a monitor 120.

Alternatively, the mobile devices 104 can be based on any type of mobile computing environment, such as a laptop computer, a netbook, a tablet, a smart phone, a PDA, a wearable device, a vehicle mounted device or any other mobile computing device that is known in the art. Each mobile device 104 can include at least one processor connected to a non-transitory computer readable storage medium such as a memory. Memory can be any suitable combination of volatile (e.g. Random Access Memory ("RAM")) and non-volatile (e.g. read only memory ("ROM"), Electrically Erasable Programmable Read Only Memory ("EEPROM"), flash memory, magnetic computer storage device, or optical disc) memory. In one embodiment, memory includes both a non-volatile memory for persistent storage computer-readable instructions and other data, and a non-volatile memory for short-term storage of such computer-readable instructions and other data during the execution of the computer-readable instructions. Other types of computer readable storage medium external to the mobile device 104 are also contemplated, such as secure digital (SD) cards and variants thereof. Other examples of external computer readable storage media include compact discs (CD-ROM, CD-RW) and digital video discs (DVD).

A mobile device 104 can also include one or more input devices connected to at least one processor. Such input devices are configured to receive input and provide data representative of such input to the processor. Input devices can include, for example, a keypad and a pointing device. A pointing device can be implemented as a computer mouse, track ball, track wheel, biometric reader, active digitizer, touchscreen or any suitable combination thereof. In some examples, mobile device 104 can include additional input devices in the form of one or more additional buttons, light sensors, microphones and the like. More generally, any suitable combination of the above-mentioned input devices can be incorporated into a mobile device 104.

A mobile device 104 can further include one or more output devices. The output devices of a mobile device 104 can include a display. When the pointing device includes a touchscreen and or an active digitizer, the touchscreen and or active digitizer can be integrated with the display. Each mobile device 104 can also include a communications interface connected to the processor. The communications interface allows a mobile device 104 to communicate with the monitors 120, for example via a wireless communication link. The communications interface is therefore selected for compatibility with the monitors 120.

The monitors 120 are any access points which are operable to communicate with the mobile devices 104. In some variations, monitors can provide the mobile devices 104 with access to the network 108. Accordingly, the monitors 120 can be based on any wireless communications interface. For example, the wireless communication interface may function utilizing any wireless radio frequency channel, for example, a one or two-way messaging channel, or a mobile radio channel. Similarly, it will be appreciated that the wireless communication system may function utilizing other types of communication channels such as Institute of Electrical and Electronics Engineers (IEEE) 802.11 (Wi-Fi™), IEEE 802.16 and/or Bluetooth™ channels.

When a mobile device 104 announces its presence, or otherwise allows a monitor 120 to become aware of its presence within the communications range of that monitor 120, that monitor 120 can detect the announcement and hence the presence of the mobile device 104. The monitor 120 can, accordingly, obtain a device identifier associated with that mobile device 104. It is to be understood by persons of skill that the particular manner in which a monitor 120 detects the presence of a mobile device 104 can vary.

The device identifier can be any information that can be used to reliably track a mobile device 104, by allowing that particular mobile device 104 to be distinguished from other mobile devices 104. For example, the device identifier can include a media access control (MAC) address, or a portion thereof, associated with a mobile device 104. A MAC address can be a unique identifier, for example, of a particular mobile device 104. In variations, a device identifier can be an identifier other than the MAC address, such as a serial number of the mobile device 104 that is unique to that device.

In some implementations, a device identifier can be encrypted by the monitor 120 to anonymize the mobile devices 104 being monitored and accordingly, users associated with the mobile device. The encryption is a one-way encryption based on, for example, secure hash algorithm (SHA)-512. One-way encryption can serve to anonymize a mobile device 104 with which the device identifier is associated. For example, when the device identifier is a MAC address, the MAC address would no longer be obtainable from the stored device identifier, preventing later identification of the mobile device 104 and thus, the users of the device. Moreover, by selecting the encryption methods appropriately, the encrypted device identifiers can continue to be used to reliably track mobile devices 104. For example, the probability of two different unencrypted identifiers, such as two different MAC addresses, mapping to the same encrypted identifier can be minimized through the choice of appropriate encryption methods. Accordingly, the encrypted identifier for a mobile device 104 can be used to track the movements and activities of that mobile device 104, while the probability of obtaining the actual identity of a user of the mobile device 104 is significantly reduced.

To enable a meaningful tracking of the physical activities of a mobile device 104, when a monitor 120 detects a mobile device 104 within its communications range, it obtains a device identifier associated with that mobile device 104 and associates the device identifier with several items of descriptive information. For example, the monitor 120 can associate a location indicator with the device identifier. The location indicator can simply indicate the location of the monitor 120 which detects the mobile device 104. Alternatively, the location indicator can be obtained based on a received signal strength indicator (RSSI) associated with the mobile device 104. The RSSI can indicate the signal strength of the link between a mobile device 104 and a monitor 120. Generally, the farther away a mobile device 104 is from a monitor 120, the weaker the signal strength becomes. Accordingly, the signal strength can be correlated with a distance from the monitor 120 and used as a location indicator. In variations, the correlation can be varied for each monitor 120, taking into account the specific peculiarities of that monitor 120's location.

Additional descriptive information can also be obtained by a monitor 120 and the obtained descriptive information can be associated with the device identifier corresponding to the mobile device 104 for which the information is gathered. For example, a time stamp may be determined indicating the time at which the location indicator was obtained. As a further example, the monitor may also obtain, as descriptive information, characterizing information for a mobile device 104 such as the device type (e.g. smartphone), the device model and the device operating system.

Figure 2:
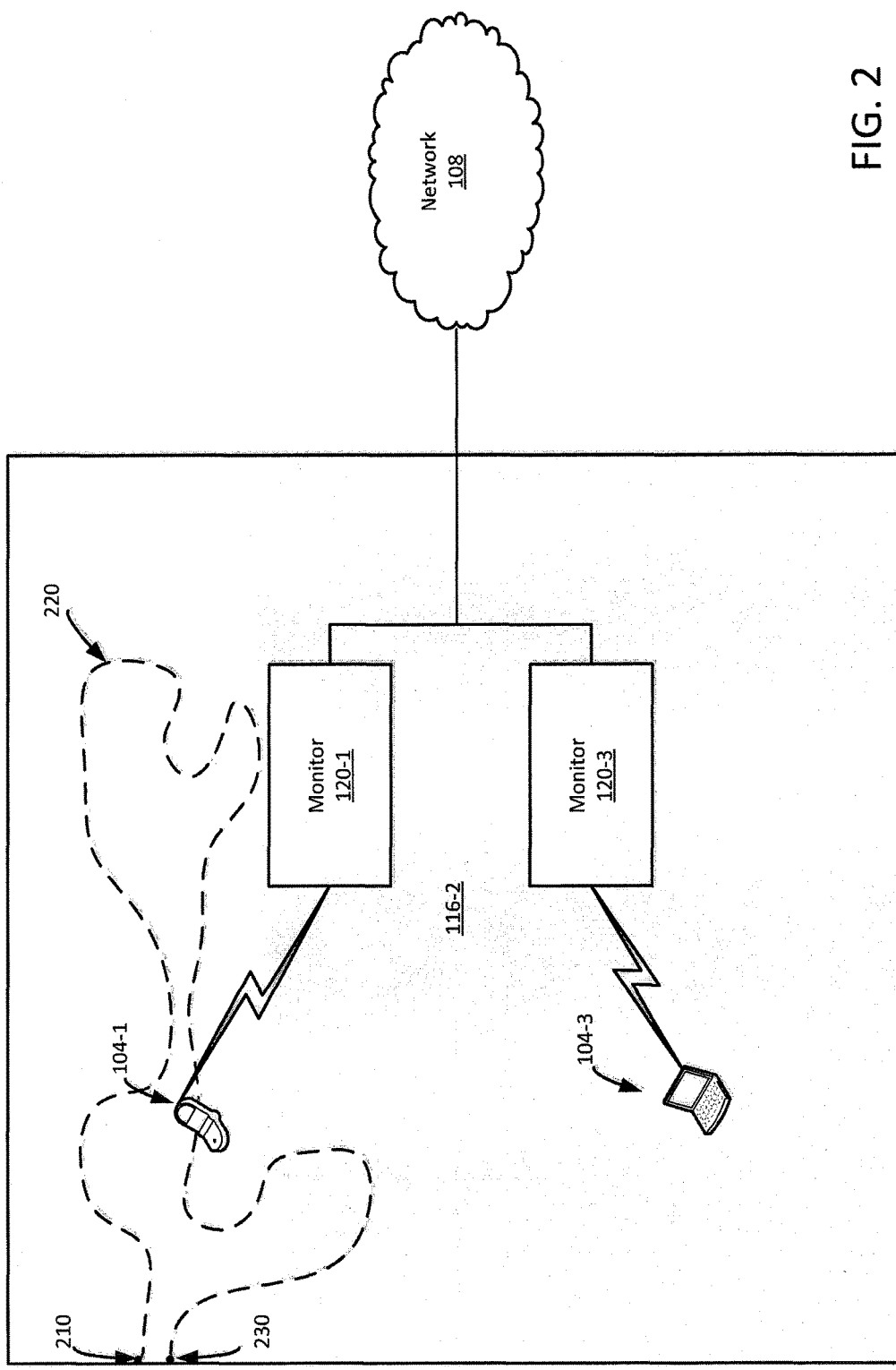
FIG. 2 shows a block diagram of an example movement pattern in accordance with an implementation.

The descriptive information can be collected over a period of time allowing a monitor 120 to collect time-based descriptive information for each device identifier associated with a different mobile device 104 within the range of a monitor 120. Accordingly, descriptive data can be gathered for a device identifier, describing the physical movements and activities of a mobile device 104 associated with the identifier. For example, referring to FIG. 2, the monitor 120-1 can gather a descriptive profile for the mobile device 104-1 that indicates that the mobile device 104-1 entered the communications range of the monitor 120-1 at 210, moved around the range of the monitor for 15 minutes in accordance with a pattern indicated by the dashed line 220 and subsequently exited the range of the monitor 120-1 at 230.

The monitors 120 can be located at different physical locations associated with different premises. A premise can be any location, such as a retail store, a library, a park, a shopping mall, a home and others that will now occur to a person of skill. For example, referring to FIG. 1, the monitor 120-3 is indicated to be located at the premises of a jewelry store 116-1. In variations, multiple monitors 120 can be located in multiple locations associated with the same premise. For example, monitors 120-1 and 120-2 are indicated as being located at different locations within the premises of a museum 116-2. Multiple monitors may be associated with a single premise for various reasons. For example, in some variations, having multiple monitors 120 at a store can allow better location tracking based on triangulation. In other variations, multiple monitors 120 may allow minimizing any dead zones, especially in cases where the premise is large, such as a library or a department store. In yet other cases, each monitor can monitor a different function located within the same premise such as different departments such as men's clothing, cosmetics and others that can be found within a department store.

In order to amalgamate the descriptive data associated with a device identifier into a comprehensive descriptive profile for that device identifier or that monitor 120, the monitors 120 can transmit the descriptive data obtained for an identifier to a monitoring server 112 through, for example the network 108. Network 108 can comprise any network capable of linking the monitors 120 with the monitoring server 112 and can include any suitable combination of wired and/or wireless networks, including but not limited to a Wide Area Network (WAN) such as the Internet, a Local Area Network (LAN), cell phone networks, Wi-Fi networks, WiMax networks and the like.

The transmission of descriptive data may occur in various ways. For example a monitor may send the descriptive data periodically. Alternatively, a monitor 120 can send the descriptive data only when a mobile device 104 can no longer be detected within the communications range of that monitor 120. In variations, the monitoring server 112 may poll each monitor 120 for the descriptive data as opposed to the monitors 120 pushing the descriptive data to the monitoring server 112. It is to be understood by persons of skill that other variations are possible and are contemplated. Typically, the descriptive data is associated with a monitor identifier, uniquely identifying the monitor 120 where the descriptive data was obtained, as well as the device identifier with respect to which the descriptive data was collected.

In general terms, the monitoring server 112 can comprise any computing platform capable of processing, transmitting, receiving, and storing data. For example, the monitoring server 112 can host numerous services such as web server services, messaging services, data processing services, social networking services and other services that will now occur to a person of skill in the art. In the present example implementation, the monitoring server 112 is a server configured for data processing. The monitoring server 112 may link with one or more service servers 124 or other computing devices, to perform one or more of its functions.

The monitoring server 112 can be based on any desired server-type computing environment including appropriate configurations of one or more central processing units (CPUs) configured to control and interact with non-transitory computer readable media in the form of computer memory or a storage device. Computer memory or storage device can include volatile memory such as Random Access Memory (RAM), and non-volatile memory such as hard disk drives or FLASH drives, or a Redundant Array of Inexpensive Disks (RAID) or cloud-based storage. The monitoring server 112 can also include one or more communication interfaces, to connect to network 108 or service servers 124. The monitoring server 112 can also be configured to include input devices such as a keyboard or pointing device or output devices such as a monitor or a display or any of or all of them, to permit local interaction. Other types of hardware configurations for the monitoring server 112 are contemplated. For example, the monitoring server 112 can also be implemented as part of a cloud-based computing solution, whereby the functionality of the monitoring server 112 is implemented as one or more virtual machines executing at a single data center or in a mirrored form across a plurality of data centers. The software aspect of the computing environment of the monitoring server 112 can also include remote access capabilities in lieu of, or in addition to, any local input devices or local output devices. Any desired or suitable operating system can be used in the computing environment of the monitoring server 112. The computing environment can be accordingly configured with appropriate operating systems and applications to effect the functionality discussed herein. Those of skill in the art will now recognize that the monitoring server 112 need not necessarily be implemented as a stand-alone device and can be integrated as part of a multi-purpose server or implemented entirely in software, for example a virtual machine. In variations, the monitoring server 112 can be implemented as a dedicated server, as shared servers or as a virtual server to implement cloud computing, a virtual private network, grid computing and others that will now occur to a person of skill.

Upon receiving the descriptive data for a device identifier from a monitor 120, the monitoring server 112 may integrate that data with a profile maintained for the device identifier and for that monitor 120. A profile associated with a device identifier is an aggregation of descriptive data accumulated over time for that device identifier. For example, over time, descriptive data may have been received from one of more monitors 120 associated with one device identifier. All of the descriptive data may be aggregated under a profile for that device identifier. A profile associated with a monitor is an aggregation of descriptive data accumulated over time for that monitor. For example, over time, descriptive data may have been received from one monitor 120 associated with various device identifiers. All of the descriptive data may be aggregated under a profile for that monitor. In variations, only profiles associated with device identifiers may be maintained and the profiles for monitors can be constructed, as needed, based on the device identifier profiles. Alternatively, only profiles associated with monitors may be maintained and the profiles for device identifiers can be constructed, as needed, based on the monitor profiles.

The monitoring server 112 may maintain classifications associated with each monitor 120 as well as each premise 116. Accordingly, when descriptive data received from a monitor 120 is added to the profile for the associated identifier, the descriptive data received may be elaborated with the addition of one or more keywords for various classifications based on the data maintained for that monitor 120. Alternatively, when descriptive data received from a monitor 120 is added to the profile for that monitor 120, the descriptive data received may be elaborated with the addition of one or more keywords for various classifications based on the profile maintained for the device identifier for which the descriptive data was obtained. In variations, classifications associated with monitors 120 may be different for one or more monitors 120.

Classifications allow the classification of the descriptive data obtained for a mobile device 104 into distinct categories. In some variations, the classifications can also include sub-classifications providing further detail. As an example, one classification could be related to the location of a monitor 120. The location classification can have additional sub-classifications of "Location Primary", corresponding to the specific location of a monitor 120, "Location Secondary", corresponding to a regional location of a monitor 120, "Location Type Primary" corresponding to the functionality of the location and "Location Type Secondary" corresponding to a secondary functionality associated with the location of a monitor 120. In variations, GPS coordinates or similar location coordinates or a country identifier may also be included as part of the location classification.

A further classification can include a product type, with the sub-classifications "Product Type Primary" for the primary types of products carried at the location of a monitor 120 and "Product Type Secondary" for the secondary types of products carried at the location of the monitor. The classifications can further include classifications for activity, brands, price point, lifestyle, target gender, target age and a catchall general one for those classifications that are not captured by any other classification. It is to be understood by those of skill that there are many other classifications and sub-classifications possible, and that the list provided above is for illustrative purposes only. In other implementations, classifications and sub classifications can be selected to allow the categorization of the descriptive data describing the physical activity of a mobile device 104 at monitors 120 in any desired manner.

To enable appropriate categorization of obtained descriptive data, a collection of keywords is maintained in association with each monitor 120. Each keyword typically corresponds to a classification or sub-classification, identifying the category or nature of a monitor 120 and its location in relation to that classification or sub-classification. For example, for monitor 120-1, the keyword "Peterborough" may be used to categorize the sub-classification "Location Primary", whereas the keyword "Ontario" may be chosen to categorize the sub-classification "Location Secondary". Keywords can be selected from a predetermined list associated with a classification or can be assigned as appropriate, not based on a predetermined list.

Figure 3:
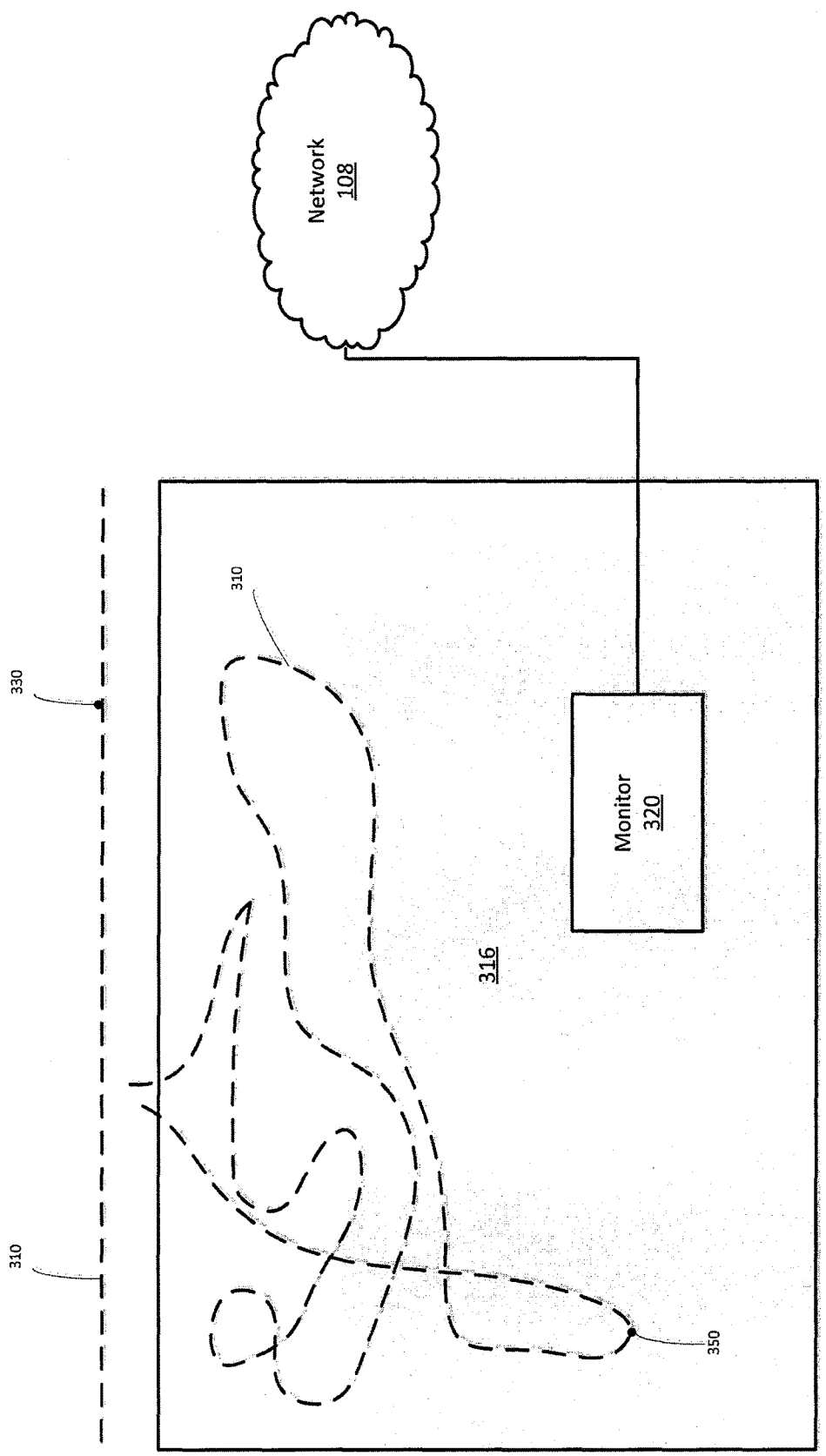
FIG. 3 shows a block diagram of an example movement pattern in accordance with an implementation.

In variations, time-based descriptive data received from a monitor 120 can be correlated with various movement patterns and the premises associated with a monitor 120 to identify an activity specific to that movement pattern. For example, a movement pattern 310 as detected by monitor 320 is shown in FIG. 3. The movement pattern 310 can be indicative of a mobile device 104 walking by the premises 316. Alternatively, when the movement pattern 310 includes a lengthy pause at point 330, it can be indicative of a window-shopper or a potential visitor. Alternatively, a movement pattern 340 may indicate a shopper or a visitor, whereas, if the movement pattern 340 includes a lengthy pause at point 350, where the cashier is located, a purchaser may be indicated. As a further example, if a mobile device 104 is determined to have been at a monitor 120 for more than an hour continuously, it may be determined that that mobile device 104 is being operated by an employee or staff of the premises 316 as opposed to a customer. Alternatively, if a mobile device 104 is detected to enter a library and head to the offices, remaining there for a brief time, the device may be identified to be operated by a delivery person.

Such identified activities may be used to further classify the descriptive data, for example, using an activity classification. Accordingly, the activity of a mobile device 104, at a location monitored by a monitor 120 may be indicated using keywords "purchaser", "visitor", "potential-visitor", "staff" and/or others that will now occur to a person of skill. In some variations, the identified activities may be used to classify profiles instead of being maintained as separate keywords associated with a classification "activity".

In variations, event information may also be received from various different sources such as service servers 124, associated with a monitor 120 at the time a device mobile 104 was detected. The event information can be any event such as the weather (it was raining) or promotional activity (there was a store wide sale), disasters, emergencies and others that will now occur to a person of skill. Accordingly, a profile can also provide aggregated information regarding the physical activity of a mobile device 104 in correlation with those events. For example, it can be determined that a mobile device 104 is typically located at a mall during rainy weather based on a correlation of rain and presence at a particular monitor 120. Alternatively, it can be determined that a device 104 visits a particular shop only when store-wide sales are in effect, or attends a bookstore when there is a book reading.

Accordingly, as a mobile device 104 moves from location to location and comes into contact with various monitors 120, the monitoring server 112 receives additional descriptive data corresponding the various monitors 120, and aggregates those, along with additional descriptive data associated with each of the various monitors 120 in a profile for the device identifier. Thus, a profile represents a source of aggregated information for the physical activity of a mobile device 104. Moreover, on the basis of the keywords, a profile includes a detailed classification of a mobile device 104's physical activity with respect to various commercial and non-commercial premises including premises such as shops and libraries, brands, product types. Additionally, based on the identified activity type, the types of activity at the premises can also be tracked.

In variations, as mobile devices 104 come into contact with a various monitor 120, the monitoring server 112 receives additional descriptive data corresponding the various mobile devices 104, and aggregates those, along with additional descriptive data associated with each of the various mobile devise 104 and the monitor 120 in a profile for the monitor 120. Thus, a profile represents a source of aggregated information for physical activity at a monitor 120. Moreover, on the basis of the keywords, a monitor 120 profile includes a detailed classification of the physical activity of the mobile devices 104 that visited that monitor 120 with respect to various commercial and non-commercial premises including premises such as shops and libraries, brands, product types. Additionally, based on the identified activity type, the types of activity at the premises can also be tracked.

In one implementation, to simplify search or storage requirements, each profile may be maintained as a keyword count of keywords associated with classifications and profile types. Accordingly, the number of times a mobile device 104 has visited a particular location can be maintained as a count, for example. In another implementation, profiles may be aggregated into macro profiles to represent activity for a cluster. The aggregation can be based, for example, on location, resulting in an aggregate profile for a region, city or a country. Alternatively, the aggregation can be based on monitor 120 type, or premise type. Accordingly, all monitor 120 profiles associated with jewelry stores can be aggregated to form a profile for a generic jewelry store. Alternatively, all individual monitors 120 located at different locations of a chain store can be combined to form a macro monitor profile for that chain store. In yet other variations, combination of keywords can be used to form macro profiles, such as a concentration of active gym users in Ontario.

One or more profiles compiled by monitoring server 112 can be accessed by client terminals 128, service servers 124 and other computing devices to generate reports based on queries of the profiles. Service servers 124 are one or more servers that perform services such as query provision, content delivery, event tracking, and others that will occur to a person of skill. Service servers can be implemented in the form of any computing platform that allows the performance of services to be provided. Client terminals 128 are one or more client terminals which can access the monitoring server 112 and can be based on any computing platform which allows such access to be performed.

Reports generated can include reports identifying the number of visitors at a location, such as a particular monitor 120, a premise 116. For example, a report can be generated indicating the number of encounters with a monitor 120 with a specific keyword. Accordingly, the number of visits by mobile devices 104 to a "Primary Location" such as Toronto or a "Secondary Location" such as Ontario can be determined. The number of visits can be further broken down into total number of visitors and the total number of distinct visitors, each of which can be determined based on the device identifiers of the devices 104 performing the visits. Alternatively, the number of purchasers or window-shoppers at any one of those locations can be identified. In variations, the number of shoppers for luxury watches in Ottawa, or the number of visitors at a gym in Peterborough who also shopped in jewelry stores in Toronto can be determined. In some variations, reports can be provided in the form of maps, showing the monitor 120 locations within a region, such as Toronto or Ontario, as well as the number of visits at each monitor based on the monitor 120 profiles, for example. For example, the visit counts may be shown as a color, allowing the map of the region to be painted based on a color legend corresponding to the number of visits. In further variations, the reports may include predictions based on a history of activity as maintained in profiles. For example a report may indicate that visits at a monitor 120 will increase by 30% in September, in comparison to the average number of visits at that monitor 120.

In general any query based on keyword, classification and profile counts and correlations can be generated. Furthermore, the queries can specify time ranges and event correlations. It is to be understood by persons of skill that the reports that can be obtained from the system 100 are limited only to the extent of the granularity of the classifications, keywords and time data maintained for each profile.

The reports can be used by operators of monitors 120, premises 116, advertising or planning entities and other entities to obtain information regarding visitors to a location such as a monitor 120 or a premise 116. Accordingly, a report may indicate that a large percentage of a convenience store's visitors park at a nearby paid parking lot, thus indicating offering parking validation at that convenience store may increase visitor traffic.

In some implementations, a monitor 120, such as 120-2 in FIG. 1, may be associated with a media station 132. In such implementations, the media to play can be based on the profiles of the mobile devices 104 detected within the vicinity of the monitor 120 associated with the media station 132. For example, if the maintained profiles for the device identifiers corresponding to the mobile devices 104 within the communication range of monitor 120-2 indicate that those mobile devices 104 have visited other high-end jewelry stores, an advertisement can be presented for high-end brands being sold at that store. Accordingly, the media displayed can be altered as the mobile devices 104 detected by the monitor 120 associated with the media station 132 changes. For example, when new mobile devices 104 are detected which have visited watch stores, advertisement for watches may replace the high-end jewelry advertisements. In variations, the media played can be based on a physical activity history of the mobile devices 104 detected at a monitor 120 associated with a media station. The physical activity history of the mobile devices 104 can be obtained based on their associated profiles. For example, if the devices 104 detected at a monitor attended, within the last week, sports events, then sports related advertisement may be displayed. In some variations, the media to be displayed at a display station may be based on monitors that are located elsewhere as opposed to an immediate vicinity of the media station, such as at the entrance of a mall where the media station is located.

Variations in the implementation of system 100 will now occur to one of skill in the art, all of which are contemplated as possible implementations of system 100 and are considered within scope. For example, in some implementations of system 100, the mobile devices 104 may connect to the network 108 through communication links other than those established with the monitors 120.

Figure 4:
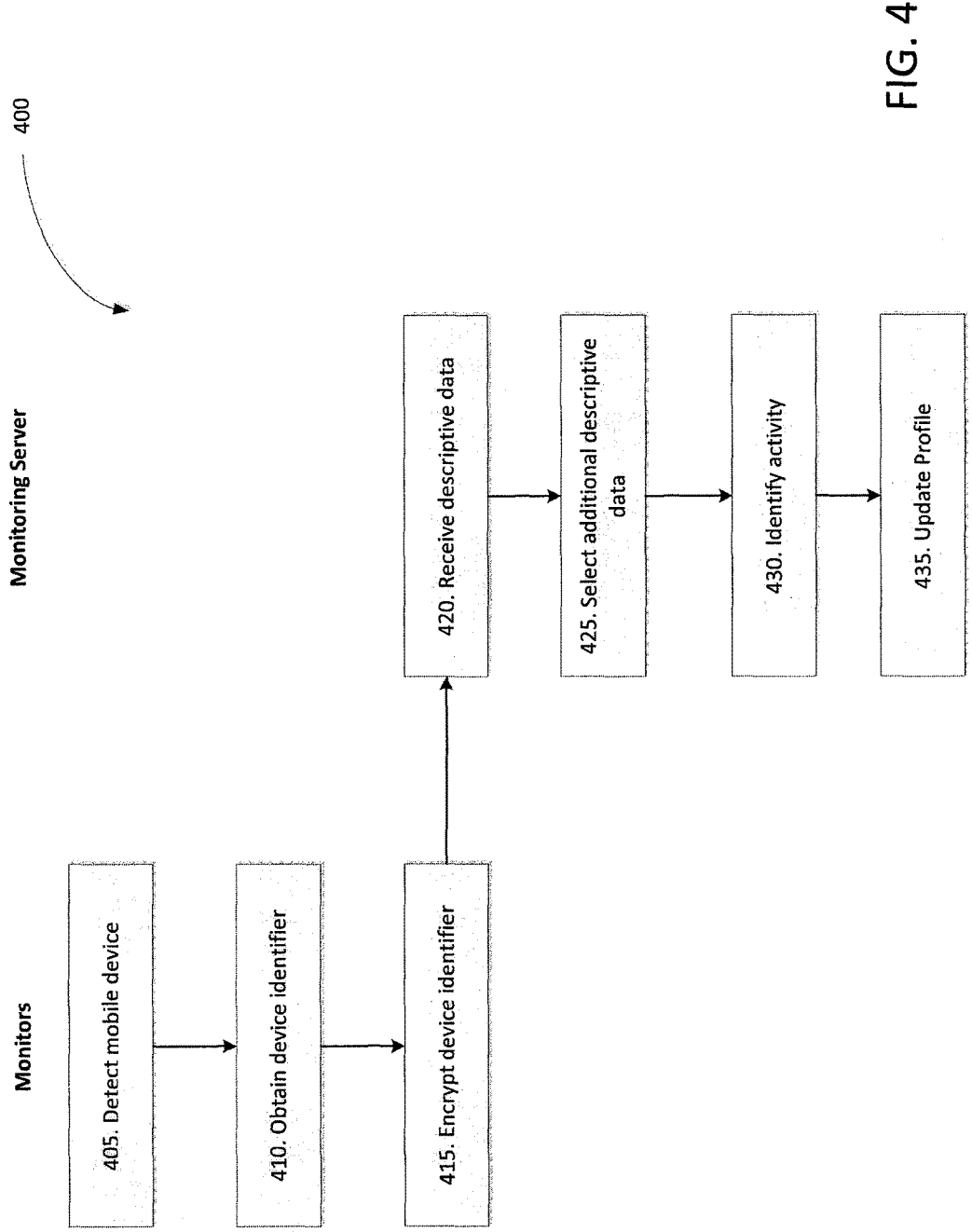
FIG. 4 shows a flow chart showing a method of physical activity monitoring in accordance with an embodiment.

Referring now to FIG. 4, a method of monitoring the physical activity of mobile devices is indicated generally at 400. In order to assist in the explanation of the method, it will be assumed that method 400 is operated using system 100 as shown in FIG. 1. Additionally, the following discussion of method 400 leads to further understanding of system 100. However, it is to be understood that system 100, and method 400 can be varied, and need not work exactly as discussed herein in conjunction with each other, and that such variations are within scope.

Beginning at 405, a mobile device is detected at a monitor 120. In this simplified illustrative example, the monitor 120-1 detects the mobile device 104-1, the monitor 120-2 detects the mobile device 104-2 and the monitor 104-3 detects the mobile device 104-3. The premise 116-2 which is a museum includes two monitors 120. The first monitor 120-1 is located at the actual museum, whereas the second monitor 120-2 is located at the gift shop of the museum. The premise 116-1 is a jewelry store and maintains the monitor 120-2 and a media station 132, associated with the monitor 120-2 for displaying relevant content.

Figure 5:
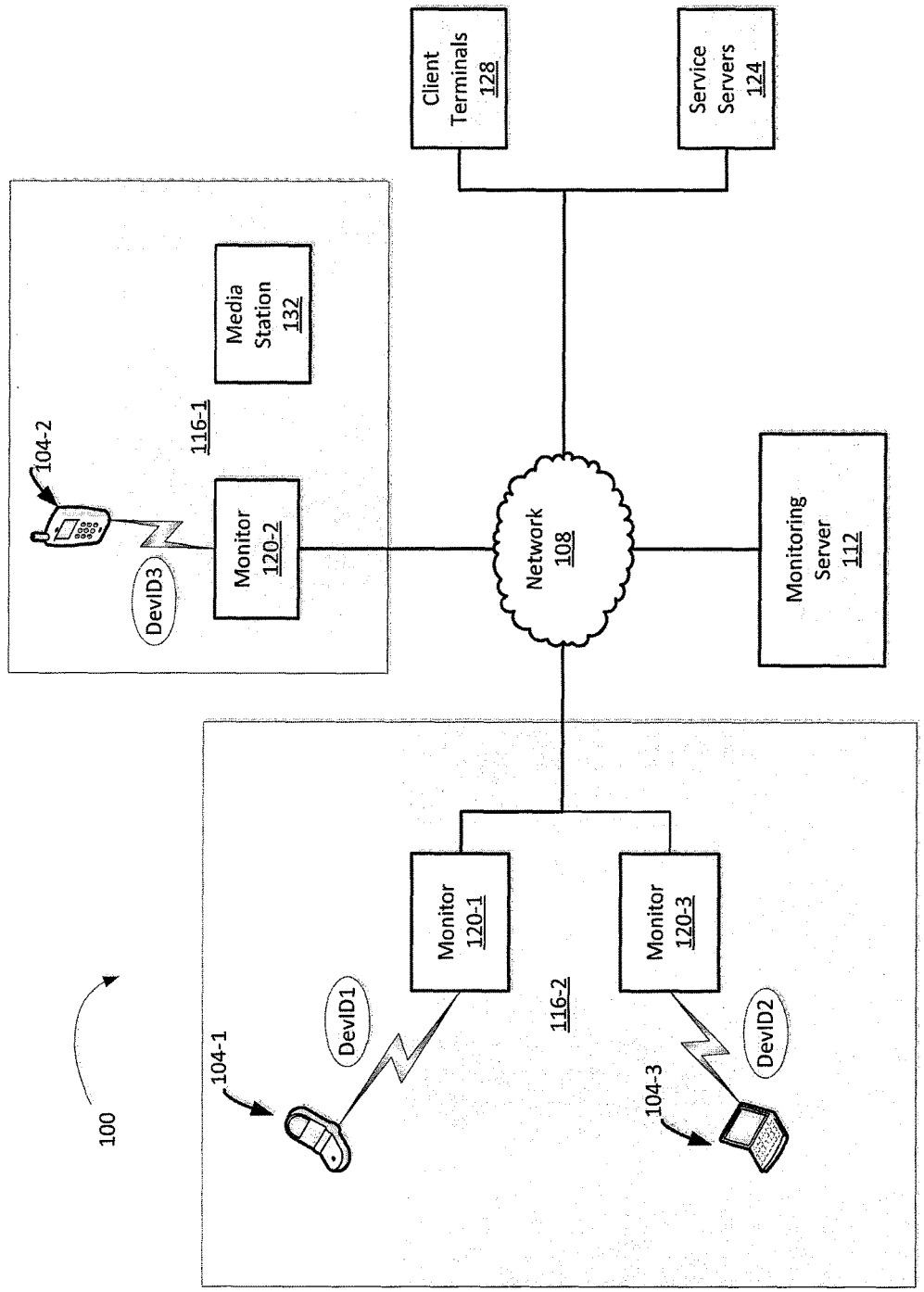
FIG. 5 shows a block diagram of the system of FIG. 1 in operation in accordance with an implementation.

Continuing at 410, the monitors 120 obtain a device identifier for each device 104 detected. In this example, referring to FIG. 5, monitor 120-1 obtains DevID1 for mobile device 104-1, monitor 120-2 obtains DevID2 for mobile device 104-2 and monitor 104-3 obtains DevID3 mobile device 104-3.

Referring back to FIG. 4, at 415, each device identifier is encrypted, at the monitors 120, with a one-way encryption to facilitate the anonymization of each mobile device 104. Accordingly, each encrypted device identifier can no longer be used to identify a mobile device 104. However, each encrypted device identifier can be used to track the activities of a mobile device 104, since the encrypted device identifiers remain unique for each mobile device 104. In this example, encrypted versions of DevID1, DevID2 and DevID3 will be referred to as eDevID1, eDevID2 and eDevID3 respectively.

Continuing with method 400, descriptive data is received at monitoring server 112 from the monitors 120 at 420. In this example, the descriptive data is assumed to be transmitted to the monitoring server 112 periodically. Furthermore, in this example, for each mobile device 104, the data transmitted includes a time-based movement pattern along with the encrypted device identifier and a monitor identifier which in this example is "monitor 120-1", "monitor 120-2" and "monitor 120-3" for the three monitors 120-1, 120-2 and 120-3 respectively.

At 425 additional descriptive data for each mobile device 104 is selected based on the monitor identifier in the descriptive data. For example, a selection of classifications and keywords are identified on the basis of the monitor identifier in the descriptive data received for a device identifier. The identification can be based on retrieving keyword and classification data maintained and associated with a monitor identifier.

Continuing with method 400, at 430 activity is identified corresponding to the descriptive data received from the monitors 120. For example, received time-based movement data can be classified to identify an activity for each mobile device 104, the identified activity replacing the movement data in some variations. In some implementations, the classification of time-based movement data is performed when a device 104 leaves the location of a monitor, for example, when it can no longer be detected at that monitor 120.

Table I shows the descriptive data, additional descriptive data and identified activity data assembled for each mobile device 104 in accordance with the present example:

TABLE I

Example descriptive data for mobile devices 104

| Classification | mobile device 104-1 | mobile device 104-2 | mobile device 104-3 |
|---|---|---|---|
| Encrypted Device Identifier | eDevID1 | eDevID2 | eDevID3 |
| Location Primary | Peterborough | Peterborough | Toronto |
| Location Secondary | Ontario | Ontario | Ontario |

TABLE I-continued

Example descriptive data for mobile devices 104

| Classification | mobile device 104-1 | mobile device 104-2 | mobile device 104-3 |
|---|---|---|---|
| Location Type | Museum | Retail | Retail |
| Product Type | Sporting | Clothing | Jewelry |
| Price Point | Low | Medium | High |
| Activity | Visitor | Purchaser | Potential visitor |

As indicated in Table I, the mobile device 104-1 is monitored based on the encrypted device identifier eDevID1 and is at a museum in Peterborough Ontario. The museum has a low price point since the museum entry is free. The mobile device 104-1 is identified as a visitor based on the time based movement pattern received from the monitor 120-1.

As further indicated in Table I, the mobile device 104-2 is monitored based on the encrypted device identifier eDevID2 and is located at a retail clothing store in Peterborough Ontario. Although not identified, the clothing store is the gift shop of the museum. In variations, classification and keyword details can be altered to specify this additional information as well. The clothing have a medium price point indicating moderately priced goods are available at the gift shop. The mobile device 104-2 is identified as a purchaser based on the time based movement pattern received from the monitor 120-2.

As additionally indicated in Table I, the mobile device 104-3 is monitored based on the encrypted device identifier eDevID3 and is located at a retail jewelry store in Toronto Ontario. The jewelry have a high price point indicating expensive goods are available at the jewelry store. The mobile device 104-3 is identified as a potential visitor based on the time based movement pattern received from the monitor 120-3. It should be noted that the classifications, keywords and activity values used in the present example are for illustrative purposes only and in other implementations, descriptive data can be composed of different classifications, keywords, activity values, as well as additional data not discussed in this illustrative example.

Continuing with method 400, at 435, profile data for each mobile device 104 is updated based on the descriptive data, the additional descriptive data and the identified activity data. In this example, a portion of the existing profile data for mobile device 104-1 as maintained at monitoring server 112 is indicated at Table II.

TABLE II

Example exiting portion of a profile for mobile device 104-1

| Classification | Keyword | Count |
|---|---|---|
| Location Primary | Peterborough | 9 |
| Location Primary | Toronto | 15 |
| Location Secondary | Ontario | 24 |
| Location Type | Museum | 0 |
| Location Type | Restaurant | 5 |
| Location Type | Retail | 19 |
| Product Type | Sporting | 1 |
| Product Type | Clothing | 7 |
| Product Type | Groceries | 10 |
| Product Type | Fast Food | 6 |
| Price Point | Low | 18 |
| Price Point | Medium | 4 |
| Price Point | High | 2 |
| Activity | Visitor | 24 |

According to Table II the mobile device 104-1 has visited 24 locations in the past. The visited locations can be distinct locations, premises, or may include visits to the same location depending on the methodology used to count. Of those locations 9 were in Peterborough and 15 were in Toronto. All were in Ontario. No visits were to a museum, 5 were to restaurants and 19 to retail locations. Of the visited locations 1 was related to sporting goods, 7 to clothing, 10 to groceries and 6 to fast food. 18 of the visited locations were inexpensive, 4 moderately priced and 2 were expensive.

It should be noted that typically a profile can include additional information and relationships which are not shown in Table II. For example, many more keywords and classification than shown in Table II can be included in a profile. Furthermore, a profile can include additional information regarding how the keywords are related. For example, indicators can exist for identifying which product types are at which price point. For example one clothing store may be at a high price point and all six clothing stores visited may be at a low price point. Furthermore, timing of each visit may also be maintained. In variations, a count may not be included in the profiles, but rather a time based list of descriptive data, appended as a mobile device 104 comes in contact with various monitors 120 can be maintained instead. The counts may then be determined when a report is generated. In further variations both a time based list and counts can be maintained. There are profile variances in the data sets that can be contemplated and related via the open table relational data base structure.

Continuing with the example, the existing profile data for the devices 104 are updated with the descriptive data, additional descriptive data and identified activity. In this example, a portion of the updated profile data for mobile device 104-1 is indicated at Table III.

TABLE III

Example updated portion of a profile for mobile device 104-1

| Classification | Keyword | Count |
|---|---|---|
| Location Primary | Peterborough | 10 |
| Location Primary | Toronto | 15 |
| Location Secondary | Ontario | 25 |
| Location Type | Museum | 1 |
| Location Type | Restaurant | 5 |
| Location Type | Retail | 19 |
| Product Type | Sporting | 2 |
| Product Type | Clothing | 7 |
| Product Type | Groceries | 10 |
| Product Type | Fast Food | 6 |
| Price Point | Low | 19 |
| Price Point | Medium | 4 |
| Price Point | High | 2 |
| Activity | Visitor | 25 |

According to Table III the mobile device 104-1 has visited 25 locations in the past. The visited locations can be distinct locations, premises, or may include visits to the same location depending on the methodology used to count. Of those locations 10 were in Peterborough and 15 were in Toronto. All were in Ontario. 1 visit was to a museum, 5 to restaurants and 19 to retail locations. Of the visited locations 2 were related to sporting goods, 7 to clothing, 10 to groceries and 6 to fast food. 19 of the visited locations were inexpensive, 4 moderately priced and 2 were expensive.

Although in this example, the profiles maintained were indicated to be device profiles, it is to be understood by people of skill that in other implementations, profiles regarding monitors may be maintained in place of or in addition to device identifier related profiles. Monitor 120 profiles can similarly be maintained as keyword counts indicating the number of visitors with that keyword at a monitor 120, for example. Moreover, macro profiles can also be formed and maintained as appropriate, indicating the appropriate keyword counts for each macro profile.

At any point during the operation of the system 100, monitoring server 112 can be queried to obtain data based on profiles maintained for use for various purposes. For example, when media station 132 determines that a new advertisement is to be displayed, it can query the content selection server 112 to target the next displayed advertising. In variations, the query may be performed by another computing device such as a service server 124, and the results of the query conveyed to media station 132 to aid with the selection of the next content. In yet further variations, the next content can be determined by another computing device such as the service server 124 based on the query results and the content to be provided indicated to the media station 132.

In the present example, a query is provided to the monitoring server 112 to determine the product types of interest to mobile devices within the vicinity of monitor 120-2 which is associated with the media station 132. Accordingly, the monitoring server 112 can identify the mobile device 104 by identifying any profiles which has had descriptive data added originating from the monitor 120-2 within the last minutes. In this example, the mobile device 104-2 is identified. Next the "Product Type" keywords and associated counts indicating how many times the device 104-2 has been at a location related to each product type can be obtained from the profile of the mobile device 104-2 and conveyed to the media station. The media station can then identify a content to display based on the received information. For example, since the highest count is for the sporting goods keyword, and advertisement can be selected with sports related content. In other implementations, a monitor can be included as part of a cable box and the media station can be a television. Accordingly, the advertisement provided to that television may be selected on the basis of the profile of the device identifier currently detected at the cable box.

In addition or alternatively, the monitoring server 112, or another server, can be configured to provide a location search service to mobile devices 104 via a web interface or an application installed on the mobile devices 104. The location search service is configured to receive a query from the user of a mobile device 104 and generate a report or other content for the user based on the query. The query can include a location selected or entered by the user, an automatically measured location of the mobile device 104 (e.g., GPS/location services), or similar. The query can include information about the content being requested (e.g., services, products, specific brands, for example, such as "Blundstone" or "Birkenstock"), while maintaining the anonymity of the user, as discussed elsewhere herein. The report can then be transmitted to the mobile device 104 as a web page or application screen, for example. The location search service can be configured to respond to queries that contain a user location and other information with reports or other content based on classifications and/or keywords of locations near the user location. The content can be advertisements, information concerning goods or services near the user, or similar. The report's content can be presented at the mobile device 104 in various ways, such as embedded into other content (e.g., location-contextual advertisements) or explicitly as a report of nearby locations. Access to the location search service can be opt-in and configured so that only mobile devices 104 that provide data to the monitoring server 112 receive the reports and content from the location search service. The techniques discussed elsewhere herein concerning queries, reports, and content can be applied. Hence, visitors to an unfamiliar location can advantageously quickly learn about the location.

Figure 6:
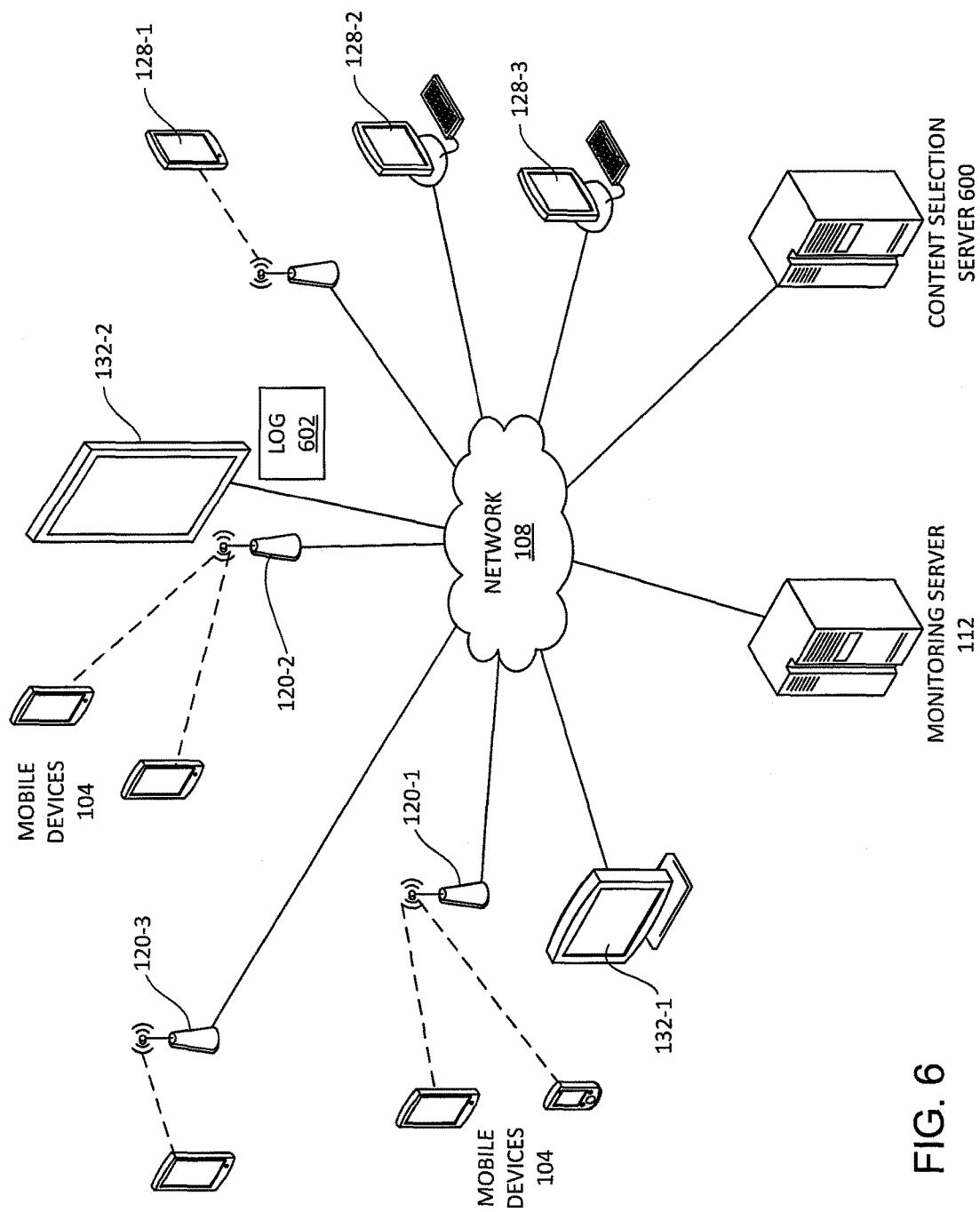
FIG. 6 shows a block diagram of a system for physical activity and media playback monitoring in accordance with an implementation.

With reference to FIG. 6, another implementation is shown. Monitors 120-1, 120-2 are positioned in association with respective media stations 132-1, 132-2. A monitor 120 may be physically positioned adjacent or near a media station 132. A monitor 120 may be physically attached to a media station 132 or installed within the media station 132, and the monitor 120 may be integral with the media station 132. When a monitor 120 and media station 132 are integral, they may share the same clock for time-stamping purposes. It is contemplated that existing or third-party media stations 132 can be supported by added monitors 120 and that monitors 120 may be physically and/or electrically integrated with media stations 132.

One or more other monitors 120-3 may also be provided, unassociated with any media station. The other monitors 120-3 can instead be associated with static media (e.g., traditional billboards), conversion locations (e.g., point-of-sale locations, ticket booths, vending machines, etc.), and similar.

Generally, the monitors 120 can be of the kinds described above, whether associated or unassociated with media stations. Examples of suitable monitors 120 include wireless network access points, point-of-sale systems, traffic counters, wearable device sensors/detectors, cameras, near-field devices, Bluetooth low energy (LE) devices, and similar.

One or more content selection servers 600 are configured to provide content to the media stations 132 for playback. Such content may include images, video, audio, and similar. Media stations 132 are generally fixed in location and can be situated at private and public locations, such as retail stores, shopping malls, transportation locations, arts facilities, airports, similar. Examples of media stations 132 include digital signage, electronic billboards, in-store monitors, information monitors, in-home smart TVs, and the like. Various groups of media stations 132 may be controlled by a particular content selection server 600. The content selection server 600 can transmit content to the respective media stations 132 that it controls via the network 108. Further, the content selection server 600 can transmit a playlist or other playback control information to the respective media stations 132. Updates to content and playlists can also be sent. A playlist is not necessarily deterministic and may include factors, rules, or other information for triggered playback (e.g., as described above with respect to targeted advertisements), heuristic playback, or playback using other methodologies.

One or more client terminals 128-1, 128-2 are configured to manage and control operations of a content selection server 600. Both wired and wireless control pathways are contemplated. A wireless client terminal 128-1 may interface with the content selection via a wireless network, such as a cellular network. Further, reports and analytics generated by the content selection server 600 may be output at the client terminals 128-1, 128-2.

The media stations 132 are configured to generate log data 602, such as log files, that record actual instances of media output. That is, each time a media station 132 plays back, or otherwise outputs, a particular element of media, the media station 132 records to its memory details about that instance of playback. Examples of playback log details include media file name or ID and a timestamp, such as playback start time, end time, duration, or a combination of such.

The monitoring server 112 is configured to receive and process the log data 602 as will be discussed in further detail below. The content selection server 600 can be configured to fetch log data 602 periodically. The content selection server 600 can further be configured to make fetched log data 602 accessible to the monitoring server 112. Alternatively, the content selection server 600 can issue a command to the media stations 132 that it controls to upload log data 602 to the monitoring server 112 directly.

The monitoring server 112 processes the log data 602 to generate reports and/or analytic data based on the playback log data 602 and data collected by the monitors 120 concerning the mobile devices 104, as discussed above. Mobile device data may be representative of physical activity or presence of mobile devices 104 and profiles representative of the aggregated activity or presence information at various monitors 120. A physical and temporal correlation can thus be made between mobile devices 104 and elements of media outputted at the media stations 132. Operations of the monitoring server 112 can be remotely controlled via the network 108 by one or more client terminals 128-3.

Figure 7:
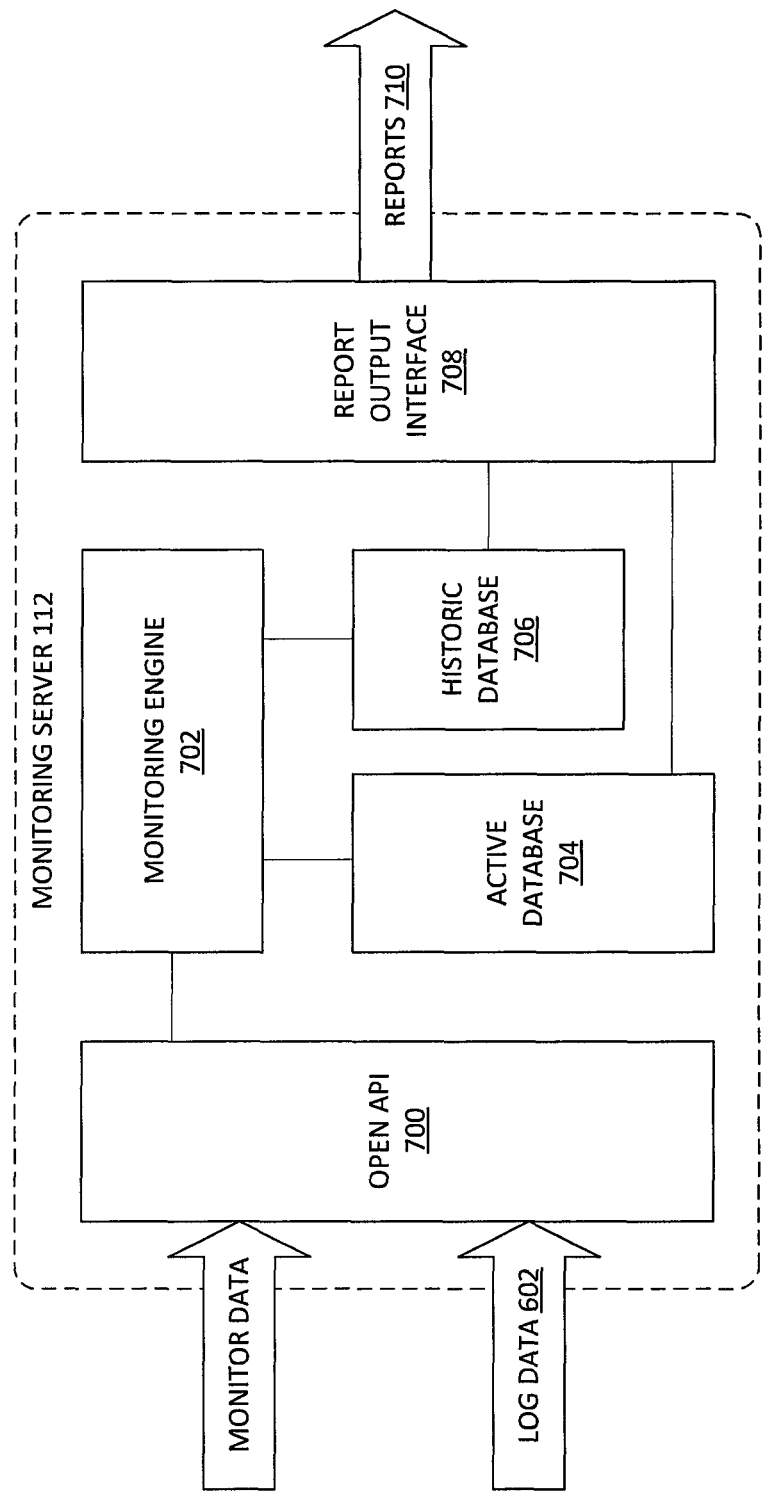
FIG. 7 shows a block diagram of the monitoring server of FIG. 6.

FIG. 7 shows an example implementation of the monitoring server 112. The monitoring server 112 includes an open application program interface (API) 700, a monitoring engine 702, an active database 704, a historic database 706, and a report output interface 708. The monitoring engine 702 is connected to the open API 700 and the databases 704 and 706 and controls receiving and storage of data. The report output interface 708 is connected to the databases 704 and 706 and controls output of data. The components 700-708 of the monitoring server 112 can be implemented as programs and data stored in memory of the server 112, where such programs are executable on a processor of the server 112. Memory includes long-term storage, such as hard drives and the like, as well as volatile memory such as RAM. The components 700-708 can be distributed among several servers, which for sake of explanation are referred to as a monitoring server 112.

Parameters for access to the monitoring server 112 via the open API 700 are made available to the monitors 120, media stations 132, content selection servers 600, and other data sources discussed herein. Such parameters can include host name, IP address, log in credentials, security certificates, and similar.

The open API 700 is configured to receive data from the monitors 120, such as data discussed above. In particular, the open API 700 is configured to receive from the various monitors 120 device identifiers in association with monitor identifiers. The device identifiers, such as anonymous token identifiers (derived from MAC addresses), uniquely identify mobile devices 104 proximate to the monitors 120 and may be one-way encrypted before being sent by the monitor 120 or after arriving at the monitoring server 112.

The open API 700 is also configured to receive media playback log data 602 from media stations 132 either directly or via the content selection servers 600.

The monitoring engine 702 is configured to process data received at the open API 700. Concerning monitoring, media/ad triggering, and other purposes discussed above, the monitoring engine 702 can be configured to process and store data received from the monitors 120. Regarding media playback log data 602, the monitoring engine 702 is configured to process the log data 602 and store it in association with mobile device monitoring data in the active database 704. To associate playback log data 602 with mobile device monitoring data, the monitoring engine 702 finds timestamps associated with device identifiers tracked near a particular media station 132 and matches such timestamps with timestamps of playback log data 602 for the particular media station 132. The monitoring engine 702 determines correlations between locations of mobile devices 104 and the timing of media playback at media stations 132, and stores such correlations in the active database 704.

The active database 704 is structured for quick writing and reading of data received from the monitoring engine 702. The active database 704 may be implemented as a relational database, for example. The active database 704 maintains data of recency relevant to requests from the report output interface 708.

The historic database 706 is structured for long-term storage of data. The historic database 706 may be implemented as a relational database, for example. The monitoring engine 702 can be configured to periodically move data from the active database 704 to the historic database 706.

The report output interface 708 is configured to query the databases 704, 706, generate reports 710 based on such queries, and output reports to client terminals, such as the client terminals 128-1, 128-2 associated with content selection servers 600. Reports 710 can be configured to present anonymous data concerning mobile devices 104 in physical and temporal proximity to the media stations 132 as well as correlations between such anonymous data and actual, measured media playback events at the media stations 132. Reports 710 can be generated in response to a request from a client terminal 128 (received at the open API 700, for example) or can be generated in response to other triggers. Reports 710 can be presented via a web interface. Email or SMS messages can be used to send alerts to view web-based reports or can contain report data.

Reports 710 can include a variety of data. Recent or near real-time reports can include anonymized information about mobile devices 104 presently near media stations 132, which can inform real-time playback decisions if supported by the media stations 132. Recent or near real-time reports can also be used to inform real-world decisions, such as temporary sales, the temporary opening or closing of locations based on desired occupancy, the presentation of informational notices, and similar. Longer term reports can include trends for particular locations and associations among locations, such as sales conversions. For instance, a report can show an association between mobile devices present for certain instances of media playback with later presence by such devices at locations indicated in such videos. In one example, a report can show the percentage of devices present for playback of a video advertisement for a theme park with presence at the theme park within a specified period, such as two months. Historic reports can be generated to show longer trends and overall correlations. For instance, repeated playback of a particular category of media may be correlated to a desirable increase in visitors to a particular space. Reports may also be generated to offer predictive information. That is, information about mobile devices present during media playback may be used to inform locations about a potential increase in visitors. For example, if a high number of devices determined to belong to a "parent" demographic category are detected near playback of a media in an "educational toys" category, then related businesses (e.g., the sponsor of an ad) near the media station can be alerted to the possibility of a short term increase in visitors.

Other types of reports 710 are also contemplated. In general, reports as discussed herein refer to data, whether presented as an organized summary of correlated information, as a relatively short alert message, as calculated analytics data, or in another format.

Figure 8:
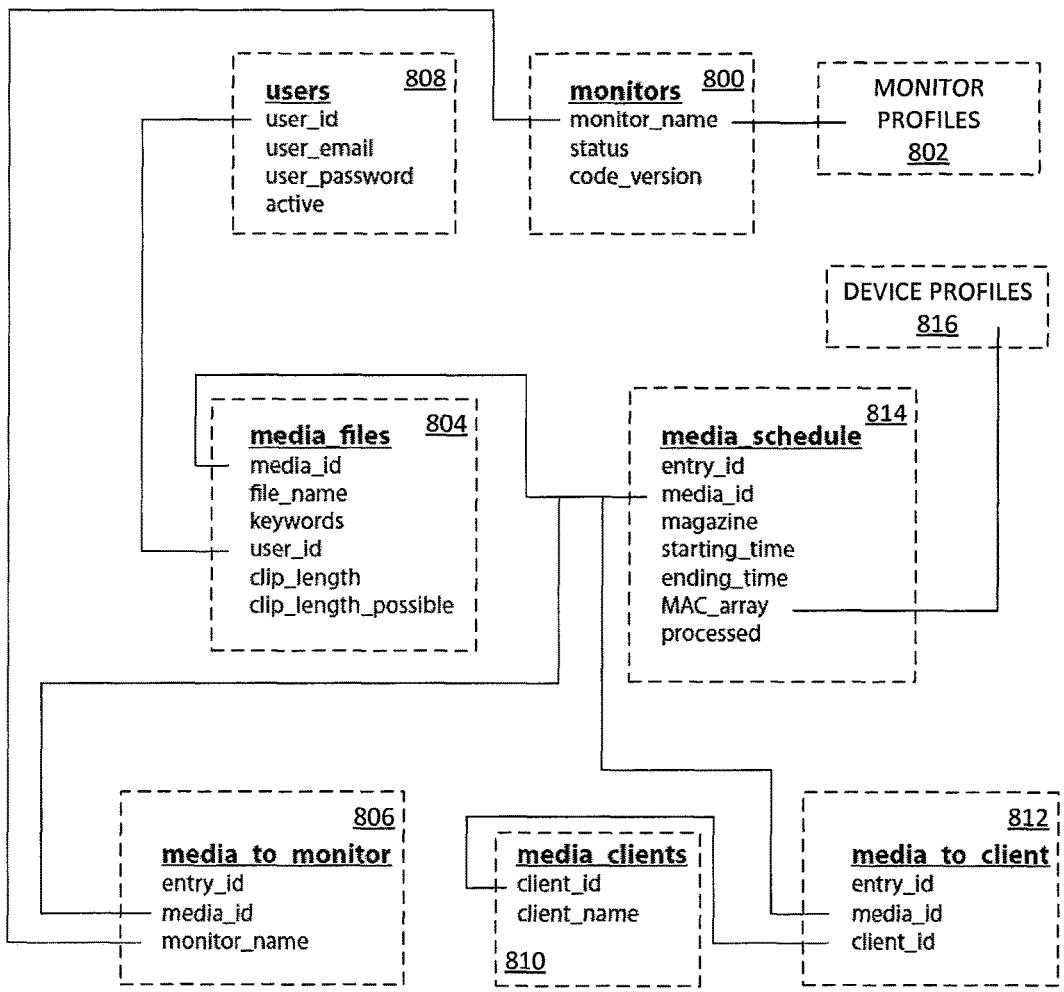
FIG. 8 shows a data structure for the monitoring server of FIG. 7.

FIG. 8 shows a data structure that can be used by active database 704 to store correlations between monitors 120 and media playback at media stations 132. The data structure follows a relational database model. However, other database models are also suitable.

Monitor data 800 can include a name or identifier for the monitor 120, status, and version information. Monitor data 800 can store or be associated with monitor profiles 802. Monitor profiles are discussed in detail above. A monitor profile can be considered a station profile for media stations 132 associated with the particular monitor 120. Alternatively, distinct station profiles can be stored, where one or more monitors 120 influence to a station profile.

Media file data 804 is associated with the monitors 120 by a many-to-many association 806. Media file data 804 can include a file name or identifier, keywords assigned to a file, and playback information, such as video clip length. Media file data 804 can be associated with user data 808 which can be used to administer the media file data 804. User data 808 can include credentials usable by the content selection server 600, the media stations 132, or client terminals 128 to access the monitoring server 112 and specify media file data 804. Levels of privilege can be established by the user data 808. In one example, a privilege decision is whether or not to associate a user to a media file.

Media file data 804 can also be associated with client data 810, such as client names, campaign names, and similar, via a many-to-many association 812. It is contemplated that multiple clients may be associated to a particular media element. For example, a cooperative advertisement or a media partnership may require that several clients be associated with the same media files. Client data 810 allows reports to be generated for specific clients or campaigns.

Media schedule data 814 stores the actual measured playback information for the media files as received from the log data 602 of the media stations 132. Media schedule data 814 has a many-to-one association with media file data 804. Media schedule data 814 can include timestamps indicating start time, end time, duration, or a combination of such. In addition, each element of media schedule data 814 can include an array of device identifiers (e.g., tokenized from MAC addresses) for the mobile devices 104 detected as proximate to the relevant media station 132 when playback media occurred. The array of device identifiers can be built from data received from the monitors 120, and which may be stored in a different data structure. Storing associated device identifiers as an array in a single row of a table representing the media schedule data 814 can advantageously increase query response time.

Media schedule data 814 can be associated to mobile device profiles 816 via the array of device identifiers. Anonymized device data can therefore be associated to media playback events. Device profiles 816 are discussed in detail above.

Mobile devices 104 are positionally and temporally correlated to media playback at the various media stations 132. Positional correlation is made through the monitors 120 that detect the mobile devices 104 and through the correlation of monitors 120 to media stations 132. That is, a monitor 120 attached to or installed near a particular media station 132 detects mobile devices that are positionally associated with that media station 132. Such mobile devices 104 are carried by users who may be paying attention to the media station 132.

Temporal correlation is performed by matching timestamps of device identifier captures by the monitors 120 to playback timing information captured from the playback log data 602 received from the media station 132. That is, whether a mobile device 104 is detected near a media station 132 and its duration near the media station 132 can be correlated to the particular media played at that media station 132 at that time. In one example, a mobile device's presence timestamp is compared to the start and end times of video clips. If the mobile device's timestamp is between the start and end times of video clip the user of that mobile device 106 is considered to have seen that video clip. A weighting or confidence can be assigned to such a determination to account for unknown factors about the user, such as the user being present but looking away from the screen. In another example, multiple presence timestamps for a mobile device 106 between start and end times of a video clip, increase the confidence assigned to the mobile device 106. Other techniques are also contemplated.

Figure 9:
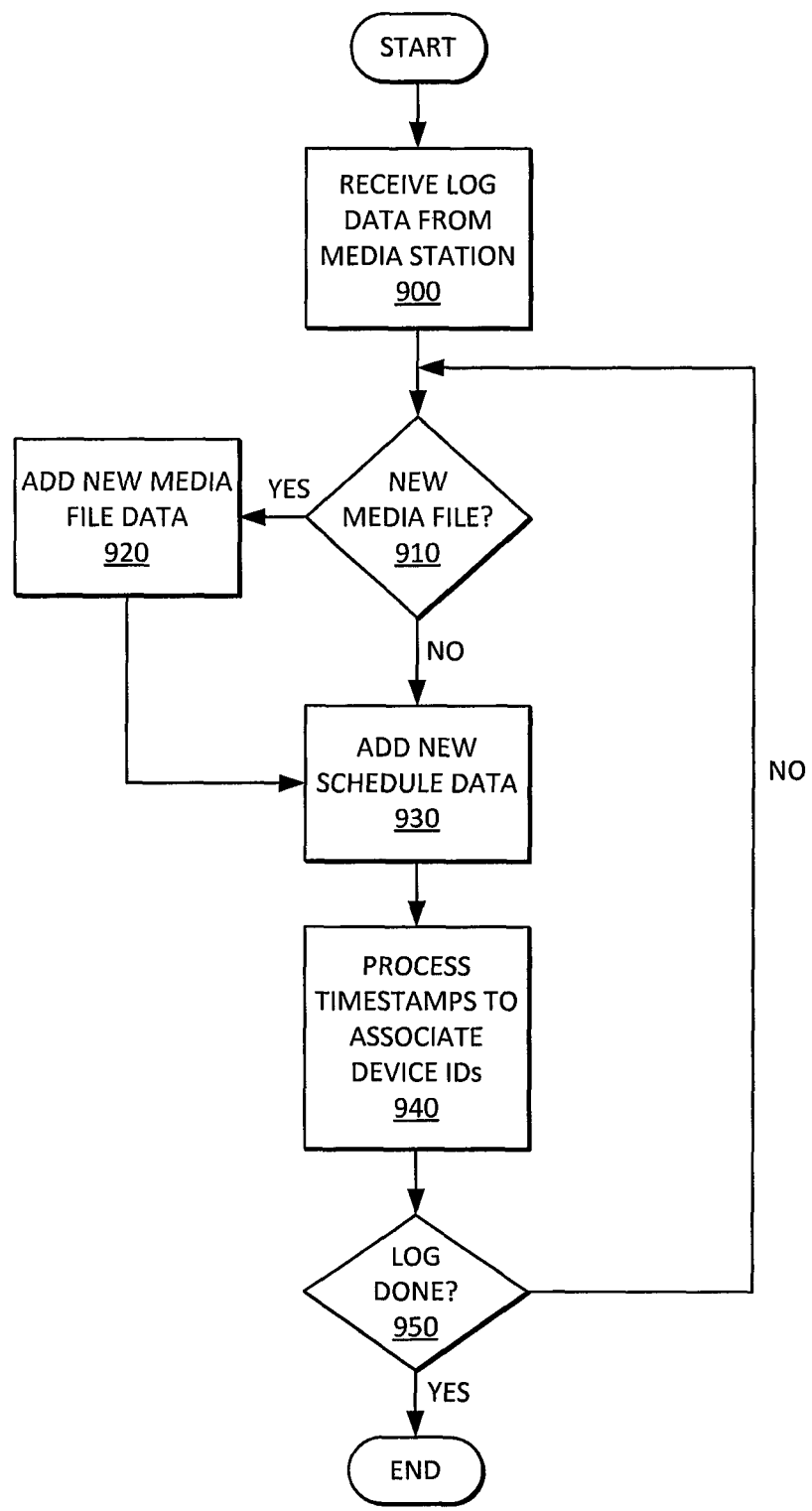
FIG. 9 shows a flowchart of a method for the monitoring server of FIG. 7.

FIG. 9 shows a flowchart for capturing playback log data and storing such in association with device identifiers.

At 900, log data is received from one or more media stations 132. Log data may be obtained by, for example, the relevant content selection server 600 executing a script to fetch log data and forward the log data to the monitoring server 112. Alternatively, log data can be sent directly to the monitoring server 112. Log data can be obtained at a periodic interval, such as once per day per media station 132. This can reduce network usage, while maintaining advantages of data relevancy, in that log data that is one day old is contemplated to have acceptable latency in many situations.

Each entry of the log data is then parsed.

If a new media file is detected in the log data at 910, then data for the new media file data 804 is recorded, at 920. New media files can be determined based on file name, file date, or file size, video clip playback length, or some combination of such.

If media file data already exists for the media file, or after new media file data is recorded, new media schedule data 814 is recorded, at 930. Timestamps indicative of when the media file was outputted are stored. The timestamps can be corrected for time zones by, for example, resolving to coordinated universal time (UTC). Time zone data may be obtained from the media station 132, such as from an internal clock of the media station 132, which may be kept current via a cellular data connection of the media station 132.

At 940, UTC timestamps associated with mobile device presence data received from the monitors 120 are analyzed. Such data may have been already obtained and be stored in a database or database table at the monitoring server 112 or another server. Alternatively, mobile device presence data can be fetched, in real-time or as needed, at 940 from monitors 120 associated with the media station 132 that provided the log file. Mobile device presence data can be queried using a query limited by the timestamp information of the media schedule data just recorded. Weighting or confidence factors can be applied. Zero or more device identifiers are thus obtained and an array of device identifiers is constructed and stored in the media schedule data 814.

Lastly, at 950 it is determined whether the present log data is complete. If not, the above is repeated for any remaining log data. In this way, media playback log data can be quickly and efficiently digested and correlated to mobile device physical and temporal and presence data.

Numerous advantages of the above techniques should be apparent. A large amount of data can be collected and distilled into useful information about mobile device users and their attention paid to media. When marketing is a concern, conversions can be tracked, whether they occur quickly or far in the future. Moreover, tracking is anonymous while still providing useful information about the movement and activities of mobile device users.

The above-described embodiments are intended to be examples and alterations and modifications may be effected thereto, by those of skill in the art, without departing from the scope which is defined solely by the claims appended hereto. For example, methods, systems and embodiments discussed can be varied and combined, in full or in part.

We claim:

1. A method of correlating mobile device users to media playback, the method comprising:
    receiving log data from at least one remote media station, the log data indicative of playback of media files at the at least one remote media station;
    obtaining media playback time information from the log data;
    receiving mobile device presence information from at least one remote monitor, the remote monitor being positionally associated with the at least one remote media station, the mobile device presence information including time information indicating at least one time that at least one mobile device was in proximity to the remote monitor;
    matching the time information from the log data with time information of the at least one mobile device to obtain a mobile device identifier for any mobile device in proximity to the remote monitor during playback of media files;
    storing associations of media files and mobile device identifiers; and
    outputting at least one report based on at least one association of at least one media file and at least one mobile device identifier.

2. A monitoring server comprising:
    at least one processor and memory implementing an input interface, a monitoring engine, and a report output interface;
    the input interface configured to receive log data from at least one remote media station, the log data indicative of playback of media files at the at least one remote media station, the input interface further configured to receive mobile device presence information from at least one remote monitor, the remote monitor being positionally associated with the at least one remote media station, the mobile device presence information including time information indicating at least one time that at least one mobile device was in proximity to the remote monitor;
    the monitoring engine configured to obtain media playback time information from the log data, match the time information from the log data with time information of the at least one mobile device to obtain a mobile device identifier for any mobile device in proximity to the remote monitor during playback of media files, and store associations of media files and mobile device identifiers; and
    the report output interface configured to output at least one report based on at least one association of at least one media file and at least one mobile device identifier.

* * * * *